United States Patent
Kawato et al.

(10) Patent No.: US 7,815,727 B2
(45) Date of Patent: Oct. 19, 2010

(54) TITANIUM OXIDE FOR INCORPORATION INTO THERMOPLASTIC RESIN COMPOSITION, THERMOPLASTIC RESIN COMPOSITION, AND MOLDED OBJECT THEREOF

(75) Inventors: Hiroshi Kawato, Chiba (JP); Yoshihiko Horio, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 1091 days.

(21) Appl. No.: 10/533,953

(22) PCT Filed: Nov. 5, 2003

(86) PCT No.: PCT/JP03/14103

§ 371 (c)(1),
(2), (4) Date: May 4, 2005

(87) PCT Pub. No.: WO2004/044044

PCT Pub. Date: May 27, 2004

(65) Prior Publication Data

US 2005/0272857 A1    Dec. 8, 2005

(30) Foreign Application Priority Data

Nov. 13, 2002  (JP)  ............................. 2002-329533

(51) Int. Cl.
*C04B 14/30* (2006.01)
*C08K 3/30* (2006.01)
*C08K 3/22* (2006.01)

(52) U.S. Cl. ............................. 106/436; 524/4; 524/6; 524/497; 524/523; 524/847; 106/400; 106/443; 106/446; 106/445; 428/402; 428/403; 428/404; 428/405; 428/407; 523/505; 523/512; 523/513; 523/514; 523/515

(58) Field of Classification Search ............... 106/400, 106/436, 443, 446, 445; 428/402, 403, 404, 428/405, 407; 523/505, 512, 513, 514, 515; 524/497, 523, 847, 4, 6
See application file for complete search history.

(56) References Cited

U.S. PATENT DOCUMENTS

| | | | | |
|---|---|---|---|---|
| 3,329,448 A | * | 7/1967 | Allen | .................. 285/123.5 |
| 3,329,484 A | * | 7/1967 | Long et al. | .................. 423/611 |
| 6,659,906 B2 | * | 12/2003 | Oshidari | .................. 476/10 |
| 6,695,906 B2 | * | 2/2004 | Hiew et al. | .................. 106/446 |
| 6,740,312 B2 | | 5/2004 | Chopin et al. | |
| 6,956,073 B2 | * | 10/2005 | Takagi et al. | .................. 524/127 |
| 2005/0170180 A1 | * | 8/2005 | Kawa | .................. 428/402 |

FOREIGN PATENT DOCUMENTS

| | | |
|---|---|---|
| CN | 1211272 | 3/1999 |
| DE | 15 92 951 | 2/1971 |
| EP | 0 988 853 A1 | 3/2000 |
| EP | 1 452 564 B1 | 1/2006 |
| GB | 1179171 | 1/1970 |
| JP | 05-128912 | 5/1993 |
| JP | 08-059976 | 3/1996 |
| JP | 09-316314 | 12/1997 |
| JP | 09-316315 | 12/1997 |
| JP | 2002-156511 | 5/2002 |
| WO | WO 00/44830 A1 | 8/2000 |
| WO | 01/40380 | 6/2001 |

OTHER PUBLICATIONS

Product description, "DuPont Ti-Pure R-103 Titanium Dioxide", Copyright 2007, 2 pages.

* cited by examiner

*Primary Examiner*—Sanza L McClendon
(74) *Attorney, Agent, or Firm*—Oblon, Spivak, McClelland, Maier & Neustadt, L.L.P.

(57) ABSTRACT

A thermoplastic resin composition which comprises (A) 40 to 98 mass % thermoplastic resin and (B) 60 to 2 mass % titanium oxide particles whose surface has been coated with a hydrous oxide and/or oxide of at least one metal selected from the group consisting of aluminum, silicon, zirconium, tin, cerium, titanium, and zinc, wherein the titanium oxide particles contain 80 to 97 mass %, excluding 97 mass %, titanium oxide ingredient and have total content of alkali metal cations and alkaline earth metal cations extractable with pure water of 120 mass ppm or lower. The resin composition is excellent in reflectance and thermal stability in residence during molding into large products.

17 Claims, No Drawings

TITANIUM OXIDE FOR INCORPORATION INTO THERMOPLASTIC RESIN COMPOSITION, THERMOPLASTIC RESIN COMPOSITION, AND MOLDED OBJECT THEREOF

TECHNICAL FIELD

The present invention relates to a thermoplastic resin composition such as a polycarbonate resin composition and a molded object thereof, and more particularly, to a thermoplastic resin composition having high reflectance and excellent thermal stability in residence such as a polycarbonate resin composition, and a molded object thereof.

BACKGROUND ART

Because of excellent in properties such as mechanical strength (especially, impact-resistant properties), electrical properties, transparency etc., polycarbonate resins have been widely used as engineering plastics in various sectors such as office automation equipment, electrical and electronic equipment, automobiles, etc. Recently, in the field of liquid-crystal displays, high reflectance materials made of polycarbonate resins increasingly have greater use in backlight application. Among others, application to monitors and televisions is remarkable, and enlargement of a backlight member is increasingly in progress as the display size is becoming larger. Accordingly, as parts of the backlight member such as a reflecting plate, a reflecting frame, a cold cathode-ray tube supporter etc. are becoming lager and the residence time during molding is becoming longer, there is a tendency that thermal stability in residence under harder molding conditions than with conventional conditions is desired. In addition, since manufacturing abroad has become frequent due to globalization in recent years, a material having a wide range of manufacturing conditions is increasingly desired, wherein the material can provide good products regardless of the level of skills or the level of perfection of molding techniques or molding machines.

On the other hand, in order to provide a reflecting function, incorporation of titanium oxide into polycarbonate-type resins or polyester-type resins has been conventionally performed. In such a case, methods for improving the thermal stability in residence have been generally adopted, for example, to prevent hydrolysis reaction between the polycarbonate resins and titanium oxide by using a method such as coating titanium oxide with a reactive silicone in advance. However, there was a problem, that is, when the amount of titanium oxide was increased in order to improve the reflectance of the composition, the thermal stability in residence during molding became increasingly poor, resulting in the reduction of the reflectance and appearance of the molded object, and hence it was generally difficult to make high reflectance and the thermal stability in residence during molding compatible with each other.

Further, there is disclosed a resin composition wherein an inorganic filler whose base amount is 20 μmole/g or less is used in order to provide a resin with sufficient thermal decoloration resistance and mechanical strength (refer to, for example, Japanese Unexamined Publication No. H9-3211, page 1 to page 4). In order to improve the reflectance by blending titanium oxide, it is preferable to increase the coating amount of a hydrous oxide and/or an oxide of a metal, for example, silica-alumina on the surface of titanium oxide particles (the base amount becomes 20 μmole/g or more). However, when commercially available titanium oxide particles with a large coating amount of silica-alumina were used directly, there was a phenomenon of lowering of the thermal stability in residence, that is, there was a limit in the improvement of thermal stability in residence by using only the method described above, wherein the titanium oxide was coated with a reactive silicone in advance.

DISCLOSURE OF THE INVENTION

The present invention was made in view of the situation, and an object of the present invention is to provide a thermoplastic resin composition, such as a polycarbonate resin composition, etc., wherein the thermoplastic resin composition has excellent reflectance and thermal stability in residence during molding into large products.

The present inventors have studied intensively to solve the problem described above and have found that a thermoplastic resin composition and a molded object thereof satisfy the object, wherein a thermoplastic resin and titanium oxide coated with a hydrous oxide and/or an oxide of at least one metal selected from the group consisting of aluminum, silicon, zirconium, tin, cerium, titanium and zinc are blended each in a specified amount, and completed the present invention.

That is, the present invention provides a thermoplastic resin composition which comprises (A) 40 to 98 mass % of a thermoplastic resin and (B) 60 to 2 mass % of titanium oxide particles coated with a hydrous oxide and/or an oxide of at least one metal selected from the group consisting of aluminum, silicon, zirconium, tin, cerium, titanium and zinc, wherein the titanium oxide particles contain 80 to 97 mass %, excluding 97 mass %, of titanium oxide ingredient and the total amount of alkali metal cations and alkaline-earth metal cations dissolved into pure water is 120 mass ppm or less, and a molded object thereof.

THE MOST PREFERRED EMBODIMENT TO CARRY OUT THE INVENTION

In the thermoplastic resin composition of the present invention, as the thermoplastic resin used as ingredient (A), it is preferable to use a colorless transparent resin such as a polycarbonate-type resin, an acrylic-type resin such as polymethyl methacrylate (PMMA) and the like, a polyester-type resin such as polyethylene terephthalate (PET), polybutylene terephthalate (PBT) and the like, a styrene-type resin, a polyether-nitrile resin (PEN), a liquid-crystal resin (LCP), etc. These resins may be used alone or in a combination of two or more thereof. When, as the thermoplastic resin to be used, the polycarbonate-type resin, the polyester-type resin and the liquid-crystal resin that have carbonate bonding or ester bonding in their molecular skeletons and hence have a problem of hydrolysis reaction are used, substantial effect of the thermal stability in residence is obtained. Among these resins, it is preferable to use the polycarbonate-type resin alone or the thermoplastic resin in which the amount of the polycarbonate-type resin is 50 mass % or more, also from the point of maintaining the mechanical strength.

As the polycarbonate resin, various resins can be named, however, a polymer having a repeated unit of the structure represented by general formula (I) is preferable.

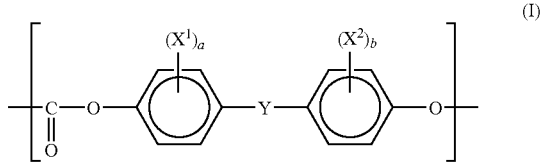

In the above general formula (I), $X^1$ and $X^2$ independently refer to a linear-chain, branched, or cyclic alkyl group with 1 to 8 carbon atoms, and specific examples include methyl group, ethyl group, n-propyl group, isopropyl group, n-butyl group, isobutyl group, tert-butyl group, n-amyl group, isoamyl group, n-hexyl group, isohexyl group, cyclopentyl group, cyclohexyl group, and the like. The $X^1$ and $X^2$ may be identical or different. The symbols a and b refer to the number of substitutions of $X^1$ and $X^2$, respectively, and the number ranges from 0 to 4. If there is a plurality of $X^1$s, the $X^1$s may be identical or different, and if there is a plurality of $X^2$s, the $X^2$s may be identical or different each other.

Y indicates single-bond, alkylene group having 1 to 8 carbon atoms (for example, methylene group, ethylene group, propylene group, butylene group, pentylene group, hexylene group, etc.), alkylidene group having 2 to 8 carbon atoms (for example, ethylidene group, isopropylidene group, etc.), cycloalkylene group having 5 to 15 carbon atoms (for example, cyclopentylene group, cyclohexylene group, etc.), cycloalkylidene group having 5 to 15 carbon atoms (for example, cyclopentylidene group, cyclohexylidene group, etc.), —S— bond, —SO— bond, —$SO_2$— bond, —O— bond, —CO— bond, or a bond represented by formulas (II-1) or (II-2).

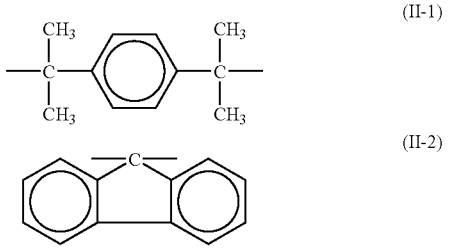

In general, the polymer described above can be easily manufactured by reacting a divalent phenol represented by general formula (III)

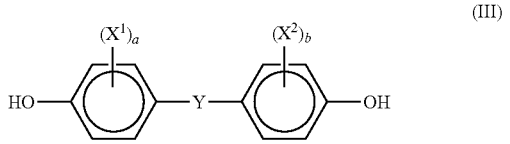

(wherein $X^1$, $X^2$, a, b and Y are the same as defined above.) and a carbonate precursor such as phosgene, a carbonate ester compound, or the like.

That is, the above polymer may be manufactured, for example, by reacting a divalent phenol and a carbonate precursor such as phosgene in a solvent such as methylene chloride in the presence of a known acid receptor or a molecular weight regulating agent, or by an ester-exchange reaction of a divalent phenol and a carbonate precursor such as a carbonate ester compound in the presence or absence of a solvent.

As the divalent phenol represented by the general formula (III) described above, various phenols can be named, however, 2,2-bis(4-hydroxyphenyl)propane (so-called bisphenol A) is particularly preferable. The divalent phenols other than bisphenol A can be exemplified by the following: bis(4-hydroxyphenyl)alkanes such as bis(4-hydroxyphenyl)methane, 1,1-bis(4-hydroxyphenyl)ethane, 1,2-bis(4-hydroxyphenyl)ethane and the like, bis(4-hydroxyphenyl)cycloalkanes such as 1,1-bis(4-hydroxyphenyl)cyclohexane, 1,1-bis(4-hydroxyphenyl)cyclodecane and the like, 4,4'-dihydroxydiphenyl, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl)ether, bis(4-hydroxyphenyl)ketone, etc. In addition, as the divalent phenols, examples include hydroquinone, etc. These divalent phenols may be used alone or in a combination of two or more thereof.

As the carbonate ester, for example, diaryl carbonates such as diphenylcarbonate, dialkyl carbonates such as dimethylcarbonate, diethylcarbonate, etc., can be named.

When a polycarbonate is manufactured by reacting the divalent phenol and the carbonate precursor described above, a molecular weight regulating agent may be used as required. The molecular weight regulating agent is not specifically limited, and an agent which has been conventionally used in polycarbonate manufacturing may be used. As a such agent, for example, monovalent phenols such as phenol, p-cresol, p-tert-butylphenol, p-tert-octylphenol, p-cumylphenol, nonylphenol and the like can be named.

The polycarbonate resin may be a homopolymer of one of the divalent phenols or a copolymer of two or more of the divalent phenols described above. Further, the polycarbonate resin may be a thermoplastic random branched polycarbonate resin obtained by a combination of a polyfunctional aromatic compound and the monovalent phenol described above.

Also, the polycarbonate resin may be a polycarbonate-polyorganosiloxane copolymer comprising an organosiloxane block having the number average degree of polymerization of 5 or more.

Further, the polycarbonate resin may be a mixture of two or more of various polycarbonate resins.

As the polycarbonate resin used as ingredient (A) in the composition of the present invention, a polycarbonate resin having the viscosity-average molecular weight (Mv) in the range of 13,000 to 30,000, and in particular 15,000 to 25,000 is preferable, from the point of mechanical strength, especially such as Izod impact strength, moldability, etc.

Polycarbonate resins having such properties are commercially available as aromatic polycarbonate resins, for example, such as Tarflon FN3000A, FN2500A, FN2200A, FN1900A and FN1500A (trade names, made by Idemitsu Petrochemical Co., Ltd.).

In the thermoplastic resin composition of the present invention, the blending ratio of the thermoplastic resin is from 40 to 98 mass %, and preferably from 70 to 95 mass %. If the blending ratio of the thermoplastic resin is less than 40 mass %, the blending ratio of titanium oxide that is an inorganic substance becomes too large, so that molding becomes difficult, or mechanical properties such as impact strength decreases. If the blending ratio is more than 98 mass %, the amount of titanium oxide particles used as ingredient (B) becomes too small, and reflectance of a molded object obtained is not improved.

The blending ratio of the titanium oxide particles as ingredient (B) is from 60 to 2 mass %, and preferably from 30 to 5 mass %. If the blending ratio of the titanium oxide particles is less than 2 mass %, reflectance of the molded object obtained is not improved. If the blending ratio of the titanium oxide particles is more than 60 mass %, molding becomes difficult, or mechanical properties such as impact strength decreases.

The titanium oxide particles as ingredient (B) are particles wherein the surface of titanium oxide is coated with a hydrous oxide and/or an oxide of at least one metal selected from the group consisting of aluminum, silicon, zirconium, tin, cerium, titanium and zinc. As the titanium oxide particles as ingredient (B), those containing titanium oxide particles having 80 to 97 mass %, excluding 97 mass % are used. If the amount of titanium oxide ingredient is 97 mass % or more, the amount of the metal hydrous oxide and/or the metal oxide of the surface coating layer becomes small, and reflectance of the obtained molded object is not improved. Also, if the amount of titanium oxide ingredient is less than 80 mass %, the amount of the metal hydrous oxide and/or the metal oxide on the particle surface becomes too large and the coating layer becomes too thick, which is not preferable because of the following reasoning: The too thick coating layer leads to a significant increase in the equilibrium water absorption coefficient (the water amount at 25° C. and the humidity of 55% in 2 hours) and consequently to a value over 0.5 mass %, and may cause hydrolysis of the thermoplastic resin such as polycarbonate, etc. Accordingly, the amount of titanium oxide ingredient is preferably about 95 to about 90 mass %. Also, the particle size of the titanium oxide particles is generally about 0.1 to about 0.5 μm. As the titanium oxide powder, both of a rutile type and an anatase type can be used, however, from the point of thermal stability, weatherability or the like, the rutile type is preferable.

As the metal element of the metal hydrous oxide and/or the metal oxide of the surface coating layer, at least one element selected from aluminum, silicon, zirconium, tin, cerium, titanium and zinc can be named. In general, titanium oxide coated with silica and/or alumina is most frequently used and is useful from the point of performance and cost.

Usually, titanium oxide particles coated with a metal hydrous oxide and/or a metal oxide described above and washed with water are commercially available. However, probably because the washing level is not high, alkali metals and alkaline-earth metals generated secondarily during a coating step remain, and alkali metal cations and/or alkaline-earth metal cations (hereinafter, may be called as metal cations) that are mainly originated from Na and K are attached to the surface etc. of the titanium oxide particles. For example, the surface of titanium oxide is coated with silica and/or alumina by neutralization of sodium silicate and/or sodium aluminate with an acid, for example. When sulfuric acid is used as the acid, sodium sulfate remains as a byproduct salt. If hydrochloric acid is used instead of sulfuric acid, sodium chloride will remain. As the acid, sulfuric acid, hydrochloric acid, nitric acid, phosphoric acid, acetic acid, oxalic acid and the like can be named. However, sulfuric acid is preferable in terms of cost, and phosphoric acid, acetic acid and oxalic acid are preferable in terms of product performance from the point of dissociation constants of residual salts. Titanium oxide particles used in the present invention should have 120 mass ppm or less of the sum of metal cations (from Li, Na, K, Mg, and Ca) that are extracted to pure water as determined by ion chromatography analysis. If the total amount of the metal cations extracted to pure water is more than 120 mass ppm, thermal stability in residence during molding of the composition lowers substantially, wherein the thermoplastic resin (especially polycarbonate) and titanium oxide particles are the main ingredients. The total amount of metal cations extracted to pure water is preferably 70 mass ppm or less, and in particular preferably 40 mass ppm or less.

Further, it is preferable that, when the total amount of alkali metal cations and alkaline-earth metal cations extracted to pure water is designated as X (mass ppm), the value of [the blending ratio of titanium oxide powder (mass %)/the blending ratio of thermoplastic resin (mass. %)]×[X (mass ppm)] is 15 mass ppm or less. By making this value 15 mass ppm or less, thermal stability in residence during molding can be improved.

In addition, as the guideline of the acceptable total amount of metal cations (mass ppm) in the titanium oxide extracted to water based on the blending ratio (mass %) of the titanium oxide particles, it is preferable that the total amount is 120 mass ppm or less when the blending ratio of titanium oxide particles is 10 mass %, the total amount is 90 mass ppm or less when the blending ratio of titanium oxide particles is 15 mass %, the total amount is 60 mass ppm or less when the blending ratio of titanium oxide particles is 20 mass %, the total amount is 35 mass ppm or less when the blending ratio of titanium oxide particles is 30 mass %, and the total amount is 23 mass ppm or less when the blending ratio of titanium oxide particles is 40 mass %. If the total amount is more than the acceptable value, thermal stability in residence decreases.

In the thermoplastic resin composition or the molded object thereof of the present invention, the sum of metal cations (from Li, Na, K, Mg, Ca) extracted to pure water as determined by ion chromatography analysis is preferably 3 mass ppm or less based on titanium oxide. If the total amount of the water-extractable metal cations from the thermoplastic resin composition is more than 3 mass ppm, thermal stability in residence of the molded object during molding of the composition decreases substantially, wherein the composition comprises thermoplastic resin (especially polycarbonate) and titanium oxide particles as the main ingredients. Additionally, by making the total amount of the water-extractable metal cations from the molded object 3 mass ppm or less, thermal stability in residence is improved. The total amount of the water-extractable metal cations from the thermoplastic resin composition or molded object thereof is more preferably 2 mass ppm or less, further more preferably 1 mass ppm or less.

When the thermoplastic resin as ingredient (A) is a polycarbonate type resin or a mixture of a polycarbonate type resin and another thermoplastic resin, depending on the blending ratio of titanium oxide particles, it is preferable to blend 0.05 to 3 parts by weight of organopolysiloxane as ingredient (C) to a total of 100 parts by weight of the thermoplastic resin as ingredient (A) and titanium oxide particles as ingredient (B) in order to prevent decomposition of the polycarbonate type resin. If the blending ratio of the organopolysiloxane is less than 0.05 mass %, the polycarbonate resin may degrade, and its molecular weight may decrease. Also, if the blending ratio of the organopolysiloxane is more than 3 mass %, a silver streak may occur on the surface of the molded object and appearance of the product may become poor.

As the organopolysiloxane, alkyl hydrogen silicones, alkoxy silicones and the like are named, for example, SH1107, SR2402, BY16-160, BY16-161, BY16-160E, and BY16-161E (made by Dow Corning Toray Co., Ltd.) can be used preferably.

In the thermoplastic resin composition of the present invention, a flame retardant as ingredient (D) may be blended, and in particular, it is preferable to blend 0 to 7 mass % of a phosphorous-based flame retardant to a total of 100 mass % of the thermoplastic resin as ingredient (A) and titanium oxide particles as ingredient (B). As the phosphorous-based flame retardant, a phosphate ester compound is named. The phosphate ester compound has functions to stabilize thermal moldability of the thermoplastic resin composition as well as to provide excellent flame retardancy through a synergetic effect with titanium oxide in ingredient (B). As the phosphate ester compound, a halogen-free phosphate ester compound which does not contain halogen atoms such as bromine is preferable, since a molded object containing it may cause less environmental pollution when it is subjected to disposal treatment.

As the halogen-free phosphate ester compound, for example, phosphate monoesters, phosphate ester oligomers, or phosphate polyesters represented by general formula (IV) can be named.

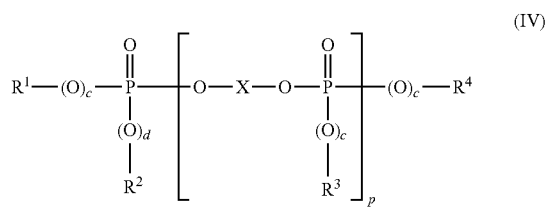

(IV)

In the general formula (IV) described above, $R^1$ to $R^4$, independently, refers to aryl group which may optionally have a substituent, and may be identical or different. X refers to arylene group which may optionally have a substituent; c, d, e and f independently refers to 0 or 1; and p refers to a number from 0 to 5. When two kinds or more of phospate esters are used, the p is represented as the average value of each p of the phosphate esters. As the substituent in the aryl group and the arylene group described above, for example, alkyl group having 1 to 10 carbon atoms, alkoxy group having 1 to 10 carbon atoms, and aryl group such as phenyl group, tolyl group and the like can be named. These substituents may be introduced as a single substituent or a plurality of substituents.

As the halogen-free phosphate ester compound represented by the general formula (IV), phosphate monoesters such as triphenyl phosphate, tricresyl phosphate, trixylenyl phosphate, tribiphenyl phosphate and the like, phosphorate ester oligomers thereof, or polyphosphate esters such as phenylresorcine polyphosphate, phenylhydroquinone polyphosphate, phenylcresylresorcine polyphosphate, phenylcresylhydroquinone polyphosphate, tetraphenylresorcine diphosphate, tetraphenylhydroquinone diphosphate, phenyltricresylresorcine diphosphate, phenyltricresylhydroquinone diphosphate, tetrabiphenylresorcine diphosphate, tetrabiphenylhydroquinone diphosphate, etc. can be named. Among them, phosphate ester oligomers and polyphosphate esters are preferable from the point of reducing adhesion to a mold during thermal molding of the polycarbonate resin composition. These phosphate monoesters, phosphate ester oligomers and phosphate polyesters may be used singly or in a combination of two or more thereof.

In the composition of the present invention, the phosphate ester compound as ingredient (D) contains 0.05 to 1.00 mass % as the phosphorus element based on the total weight of the thermoplastic resin as ingredient (A) and titanium oxide particles as ingredient (B). If the phosphorus element amount is less than 0.05 mass %, the improving effect on the flame retardancy and the synergetic effect with titanium oxide may not be shown sufficiently. Also, if the phosphorus element amount is more than 1.00 mass %, improvement of the effects described above is not so large as expected, and this is rather economically unfavorable, and further thermal stability of the molded object tends to become poor. From the point of the improving effect on flame retardancy, thermal stability of the molded object, cost etc., an especially preferable amount of the phosphorus element is 0.1 to 0.5 mass % based on the total weight of ingredient (A) and ingredient (B).

By adding a fluorinated resin as ingredient (E), the thermoplastic resin composition of the present invention can gain further higher flame retardancy. The blending ratio of the fluorinated resin is preferably 0 to 1.0 parts by weight based on the sum of (A) thermoplastic resin and (B) titanium oxide particles of 100 parts by weight. As the fluorinated resin, a fibril-forming polytetrafluoroethylene with an average molecular weight of 500,000 or more is preferable. The fibril-forming polytetrafluoroethylene can perform as a dripping inhibitor (an inhibitor of dripping of an ignited resin).

Here, the fibril-forming ability refers to an ability of a resin to undergo fibrillation when the resin is subjected to plastic shear stress in kneading or injection molding, and is effective in obtaining high flame retardancy.

Such a fibril-forming polytetrafluoroethylene (PTFE) described above can be obtained by, for example, polymerizing tetrafluoroethylene in an aqueous solvent, in the presence of sodium-, potassium-, or ammonium-oxydisufide, under the pressure of about 1 to about 100 psi, and at about 0 to about 200° C., preferably at 20 to 100° C.

There is no particular restriction in the type of thus obtained fibril-forming PTFE. However, the type, for example, classified in Class 3 in ASTM standards is suitable. As a practical commercial product, Teflon (registered trade mark) 6-J (trade name, made by DuPont Mitsui Fluorochemical Co., Ltd.), Polyflon TFE D-1, Polyflon TFE F-104 (trade names, made by Daikin industries, Ltd.), and the like are named. Other than those classified in Class 3, for example, Algoflon F5 (trade name, made by Montefluos Corp.), Polyflon MPA FA-100 and Polyflon TFE F201 (trade names, made by Daikin industries, Ltd.), and the like are named.

The fibril-forming polytetrafluoroethylene as ingredient (E) may be used singly or in a combination of two or more thereof.

In the composition of the present invention, there is no particular restriction in the amount of optionally used fibril-forming polytetrafluoroethylene as ingredient (E). However, the range of 0.01 to 1 mass % based on the total weight of the thermoplastic resin as ingredient (A) and titanium oxide particles as ingredient (B) is advantageous. If the amount is less than 0.01 mass %, its dripping inhibition effect may not be shown sufficiently. On the other hand, if the amount is more than 1 mass %, improvement of the effect corresponding to the amount may not be obtained, and it may rather become economically unfavorable.

The thermoplastic resin composition of the present invention may appropriately contain, within the range where the object of the present invention is not damaged, if necessary, various additives, for example, an oxidation inhibitor, a lubricant (a mold releasing agent), another inorganic filler, or the like.

The thermoplastic resin composition of the present invention can be prepared by, for example, kneading after blending ingredient (A), and ingredient (B); optionally used ingredient (C), ingredient (D), and ingredient (E); and various additives. As the blending method and the kneading method, those applied to ordinary resin compositions can be directly used, and a method using ribbon blender, Henschel mixer, Banbury mixer, drum tumbler, single-axis screw extruder or multi-axis screw extruder having two axes or more, cokneader, and the like is preferable. In addition, there is no particular restriction in the kneading temperature, however, in general, the temperature is appropriately selected in the range of 240 to 340° C.

The resin composition obtained in this way is molded into a flat plate or a curved plate by using an ordinary molding method, for example, injection molding, compression molding or the like, and the molded object of the present invention is obtained. The molded object is preferably used, for example, for lighting equipment and for backlight of a liquid-crystal display, and is especially preferable for a backlight reflecting plate of a liquid-crystal display.

Because of the absence of a bromine compound in its materials, the molded object of the present invention has excellent properties, such as excellent lightfastness, small lowering of reflectance in a long duration, excellent characteristics, etc., that were not available previously.

The present invention will be described in more detail with reference to examples, however, the present invention is not to be construed as being limited thereto. In addition, the amount of the metal cations was measured as follows.

(1) The Case of Titanium Oxide Particles

A 1 g aliquot of a sample was weighed into a 50 to 100 mL polyethylene container inside of which was washed with pure water in advance, and was suspended in 40 mL of pure water. A 1 g aliquot of the sample was dipped in 2 mL of methanol, suspended in water by adding 38 mL of pure water, shaken for one hour at room temperature, left standing for 30 minutes and precipitated. Next, after aspirating the supernatant with a syringe, the supernatant was passed through a disposable syringe filter having a pore size of 0.45 μm (Chromatodisc, made by G L Science Corp.), and directly injected into an ion chromatography apparatus (DX-120, made by DIONEX Corp.) set with the following conditions and analyzed.

(2) The Case of the Composition (in Pellet) or the Molded Object

After dissolving 10 g of a pellet or a molded object containing titanium oxide particles in 100 mL of methylene chloride, 40 mL of pure water was added to the methylene chloride solution. The resultant solution was shaken for one hour and left standing to separate into an aqueous phase and a methylene chloride phase. After aspirating the aqueous phase extract with a syringe, the extract was passed through a disposable syringe filter having a pore size of 0.45 μm (Chromatodisc, made by G L Science Corp.), and directly injected into an ion chromatography apparatus (DX-120, made by DIONEX Corp.) set with the following conditions and analyzed.

(3) The Analytical Conditions of the Ion Chromatography Apparatus (Analytical Conditions for Cations)
Column: IonPac CG12A+IonPac CS12A
Eluent: 20 mmole/L of methane sulfonic acid
Flow rate: 1 mL/min
Suppressor: CSRS 4 mm in the recycle-mode
Detector: electric conductivity type
Sample injection volume: 100 μL
(Analytical Conditions for Anions)
Column: IonPac AG12A+IonPac AS12A
Eluent: 2.7 mmole/L of $Na_2CO_3$/0.3 mmole/L of $NaHCO_3$
Suppressor: ASRS 4 mm in the recycle-mode
Detector: electric conductivity type
Sample injection volumte: 100 μL

EXAMPLES

Examples 1-8

(1) Preparation of Titanium Oxide Particles

Five kinds of commercial titanium oxide particles (PF-726, CR-90, CR-85, PC-3 and CR-63, made by Ishihara Sangyo Kaisha, Ltd.) were provided. PF-726 is the titanium oxide particles of which surface is coated with silica-alumina (5 to 6 mass % in total), CR-90 is the titanium oxide particles of which surface is coated with silica-alumina (10 mass % in total), CR-85 is the titanium oxide particles of which surface is coated with silica-alumina (12 mass % in total), PC-3 is the PF-726 described above coated with a polysiloxane, and CR-63 is the titanium oxide particles of which surface is coated with silica-alumina (2.5 mass % in total).

The total amount of metal cations of each of these commercial titanium oxides was measured with ion chromatography analysis. As the result, the total amount of metal cations was confirmed to be 124 mass ppm in PF-726, 146 mass ppm in CR-90, 214 mass ppm in CR-85, 135 mass ppm in PC-3, and 40 mass ppm in CR-63. Incidentally, a substantial portion of these metal cations was sodium ion. Next, four kinds of the commercial titanium oxide particles, excluding CR-63, were treated with a cleaning operation described below, and water-washed products were obtained.

First, slurry containing 10 mass. % of titanium oxide particles was prepared with pure water. Then, pH of the slurry was adjusted to 5.5 by adding an aqueous hydrochloric acid solution and the slurry was stirred for one hour. After water-soluble ingredients were extracted, the supernatant was removed. After adding pure water to the precipitated titanium oxide, the precipitate was aspirated, filtrated, and cleaned. The same filtrating and cleaning operations were repeated five times. After drying the obtained cake with a hot air dryer, the cake was subjected to crushing treatment with a cutter mixer (K55, made by Fujimac Corporation) at a rotating speed of 3,000 rpm two times. Further, the crushed cake was milled with a mortar to obtain the titanium oxide powder.

The total amount of metal cations of the obtained water-washed titanium oxide powder was measured with ion chromatography analysis. As the result, the total amount of the metal cations was confirmed to be 20 mass ppm in PF-726, 50 mass ppm in CR-90, 60 mass ppm in CR-85 comprises, and 90 mass ppm in PC-3. These results are shown in Table 1.

TABLE 1

| | | 1 | 2 | 3 | 4 | 5 |
|---|---|---|---|---|---|---|
| | | \multicolumn{5}{c}{Kind of titanium oxide particles} | | | | |
| | | Commercial titanium oxide PF-726 | Commercial titanium oxide CR-90 | Commercial titanium oxide CR-85 | Commercial titanium oxide PC-3 | Commercial titanium oxide CR-63 |
| $TiO_2$ amount (% by weight) | | 94 | 90 | 88 | 93 | 97.5 |
| Total amounts of metal cations (weight ppm) before water-washing *1) | | 124 | 146 | 214 | 135 | 40 |
| Each amounts of metal cation (weight ppm) before water-washing *1) | Li | 1 | 1 | 1 | 1 | 1 |
| | Na | 120 | 142 | 210 | 128 | 33 |
| | K | 1 | 1 | 1 | 2 | 2 |
| | Mg | 1 | 1 | 1 | 1 | 1 |
| | Ca | 1 | 1 | 1 | 3 | 3 |
| Total amounts of metal cations (weight ppm) after water-washing *2) | | 20 | 50 | 60 | 90 | — |
| Each amounts of metal cation (weight ppm) after water-washing *2) | Li | 1 | 1 | 1 | 1 | — |
| | Na | 16 | 46 | 56 | 86 | — |
| | K | 1 | 1 | 1 | 1 | — |
| | Mg | 1 | 1 | 1 | 1 | — |
| | Ca | 1 | 1 | 1 | 1 | — |

*1) Analyzed values of commercial titanium oxide powder
*2) Analyzed values of pure water-washed product (2) Manufacturing of Thermoplastic Resin Compositions The raw materials used are as follows.

(a) Polycarbonate-polydimethylsiloxane copolymer (PC-PDMS): Tarflon FC1700 (Mv=18,000, PDMS amount; 3.5 mass %, made by Idemitsu Petrochemical Co., Ltd.)

(b) Polycarbonate resin (PC): Tarflon FN1700A (Mv=18,000, made by Idemitsu Petrochemical Co., Ltd.)

(c) Polymethyl methacrylate resin (PMMA): Sumipex MHF (made by Sumitomo Chemical Co., Ltd.)

(d) Polybutylene terephthalate (PBT): TUFPET N100U (made by Mitsubishi Rayon Co., Ltd.)

(e) Halogen-free phosphate ester (phosphorus-type flame retardant): Adeka Stab PFR (phenylresorcine polyphosphate, phosphorus amount; 10.8 mass %, made by Asahi Denka Co., Ltd.)

(f) Polytetrafluoroethylene (PTFE): Algoflon F5 (with fibril-forming ability, molecular weight of 2,000,000 to 3,000,000, made by Montefluos Corp.)

(g) Organopolysiloxane: SH1107 and BY 16-161 (viscosity: 24 $mm^2/s$ and 27 $mm^2/s$, respectively, made by Dow Corning Toray Co., Ltd.)

According to the blending ratio shown in Table 2, the polycarbonate resin, the polycarbonate-polydimethylsiloxane copolymer (PC-PDMS), other thermoplastic resins, cleaned titanium oxide (water-washed product), the organopolysiloxane, PTFE, and optionally the phosphorus-type flame retardant were blended, kneaded with a vented double-axis extruder (TEM-35B, made by Toshiba Machine Co., Ltd.) at 280° C., and pellets of the thermoplastic resin composition were made.

Each pellet was dried with hot air at 120° C. for 5 hours, and molded into a flat plate having the geometry of 140 mm×140 mm×3.2 mm for reflectance measurement by using a molding machine (Sumitomo-Nestal N515/150, made by Sumitomo Heavy Industries, Ltd.) under the conditions including the molding temperature of 300° C. and the mold temperature of 80° C. Also, a molded object having an extended residence time was manufactured by molding with a molding machine (SH100, made by Sumitomo Heavy Industries, Ltd.) and a box-shaped mold having the geometry of 107 mm×152 mm×10 mm, with the wall thickness of 2 mm and two pin-gates (1 mmφ) under the conditions including the molding temperature of 300° C., the mold temperature of 80° C. and the cooling time (the molding cycle time; 160 seconds) of 130 seconds. Reflectance and appearance (presence or absence of silver streak) of each molded object were evaluated. The reflectance was evaluated based on the Y value determined with an LCM spectrophotometer (MS2020 plus, made by Macbeth Corp.). The appearance was visually evaluated. The parameter values were determined according to the formula: the parameter value=[the blending ratio of titanium oxide powder (mass %)/the blending ratio of thermoplastic resin (mass %)]×[the total amount of metal cations in the titanium oxide particles before or after water-washing (mass ppm)]. The results are shown in Table 2.

In addition, a corrugated reflecting plate having the geometry of 300 mm×240 mm×1 mm was obtained by molding with an injection molding machine (AZ7000, injection pressure; 350 tons, made by Nissei Plastic Industrial Co., Ltd.) under the conditions including the molding temperature of 310° C. and the mold temperature of 95° C.

Further, an extruded sheet having a thickness of 1 mm was obtained by extruding with a 65 mmφ mono-axis extruder furnished with a T-shaped die lip (a width of 60 cm) (SHT65-32DVg, made by Hitachi Zosen Corporation) under the conditions including the cylinder temperature of 260° C., the mold temperature of 240° C. and the roll temperature of 120 to 180° C. Further, the sheet was hot-press molded at 190° C., and a corrugated molded object having the geometry of 300 mm×240 mm×1 mm was obtained. The obtained corrugated molded object was confirmed to serve as a reflecting plate when a light source was placed thereon.

Comparative Example 1

Pellets etc. were manufactured and evaluated similarly to Example 2, except that, instead of the water-washed product of PF-726, the commercial product of titanium oxide particles, CR-63 (the titanium oxide amount of 97 mass %) was used as the titanium oxide particles. The results are shown in Table 2.

Comparative Example 2

Pellets etc. were manufactured and evaluated similarly to Example 2, except that, instead of the water-washed product of PF-726, the commercial product of titanium oxide particles, PF-726 before water-washing was used as the titanium oxide particles. The results are shown in Table 2.

Comparative Example 3

Pellets etc. were manufactured and evaluated similarly to Example 3, except that, instead of the water-washed product of CR-90, the commercial product of titanium oxide particles, CR-90 before water-washing was used as the titanium oxide particles. The results are shown in Table 2.

Comparative Example 4

Pellets etc. were manufactured and evaluated similarly to Example 4, except that, the commercial product of titanium oxide particles, CR-85 before water-washing was used as the titanium oxide particles instead of the water-washed product of CR-85. The results are shown in Table 2.

Comparative Example 5

Pellets etc. were manufactured and evaluated similarly to example 8, except that, instead of the water-washed product of PC-3, the commercial product of titanium oxide particles, PC-3 before water-washing was used as the titanium oxide particles. The results are shown in Table 2.

TABLE 2-1

| | Blending ratio | Example 1 | Example 2 | Example 3 | Example 4 | Example 5 | Example 6 |
|---|---|---|---|---|---|---|---|
| Thermoplastic resin (parts by weight) | PC | 84 | 84 | 84 | 84 | 60 | |
| | PC-PDMS | | | | | 20 | 60 |
| | PMMA | | | | | | |
| | PBT | | | | | | |
| Titanium oxide particles (parts by weight) | Water-washed product of PF-726 | 16 | 16 | | | 20 | 40 |
| | Commercial product of PF-726 | | | | | | |
| | Water-washed product of CR-90 | | | 16 | | | |
| | Commercial product of CR-90 | | | | | | |
| | Water-washed product of CR-85 | | | | 16 | | |
| | Commercial product of CR-85 | | | | | | |
| | Commercial product of CR-63 | | | | | | |
| | Water-washed product of PC-3 | | | | | | |
| | Commercial product of PC-3 | | | | | | |
| Flame retardant (parts by weight) | PFR | 3 | 5 | 5 | 5 | | |
| PTFE (parts by weight) | Algoflon | 0.5 | 0.5 | 0.5 | 0.5 | 0.5 | 0.5 |
| Organopolysiloxane (parts by weight) | BY16-161 SH1107 | 0.8 | 0.8 | 0.8 | 0.8 | 1 | 2.5 |
| Test result | Total amount of metal ions in a pellet (mass ppm) | 1 | 1 | 2 | 2 | 1 | 3 |
| | Thermal stability in residence | ⊚ | ⊚ | ⊚ | ⊚ | ⊚ | ○ |
| | Reflectance (Y value) | 97.5 | 97.5 | 98.2 | 97.8 | 97.8 | 97.7 |
| | Parameter value (mass ppm) | 3.8 | 3.8 | 9.5 | 11.4 | 5.0 | 13.3 |

Notes:
Evaluation of stability in residence
⊚: Silver streak is absent, and appearance is good.
○: Silver streak is almost absent, and appearance is good.
x: Silver streak is slightly observed, and appearance is poor.
xx: Many pieces of silver streak are observed, and appearance is poor.
xxx: Significantly many pieces of silver streak are observed, and appearance is poor.

TABLE 2-2

| Blending ratio | | Example 7 | Example 8 | Comparative example 1 | Comparative example 2 | Comparative example 3 | Comparative example 4 | Comparative example 5 |
|---|---|---|---|---|---|---|---|---|
| Thermoplastic resin (parts by weight) | PC-PDMS | 65 | 65 | 84 | 84 | 84 | 84 | 65 |
| | PMMA | 25 | | | | | | |
| | PBT | | 25 | | | | | 25 |
| Titanium oxide particles (parts by weight) | Water-washed product of PF-726 | | | | | | | |
| | Commercial product of PF-726 | | | | 16 | | | |
| | Water-washed product of CR-90 | 10 | | | | | | |
| | Commercial product of CR-90 | | | | | 16 | | |
| | Water-washed product of CR-85 | | | | | | | |
| | Commercial product of CR-85 | | | | | | 16 | |
| | Commercial product of CR-63 | | | 16 | | | | |
| | Water-washed product of PC-3 | | 10 | | | | | |
| | Commercial product of PC-3 | | | | | | | 10 |
| Flame retardant (parts by weight) | PFR | | | 5 | 5 | 5 | 5 | |
| PTFE (parts by weight) | Algoflon | | 0.5 | 0.5 | 0.5 | 0.5 | 0.5 | 0.5 |
| Organopolysiloxane (parts by weight) | BY16-161 | | 0.2 | 0.8 | 0.8 | 0.8 | 0.8 | 0.2 |
| | SH1107 | 0.6 | | | | | | |
| Test result | Total amount of metal ions in a pellet (mass ppm) | 1 | 2 | 2 | 4 | 5 | 8 | 3 |
| | Thermal stability in residence | ○ | ○ | ⊚ | x | xx | xxx | x |
| | Reflectance (Y value) | 97.4 | 97.5 | 95.8 | 97.5 | 97.9 | 98.2 | 98.2 |
| | Parameter value (mass ppm) | 5.6 | 10 | 7.6 | 23.6 | 27.8 | 40.8 | 15 |

Notes:

Evaluation of stability in residence

⊚: Silver streak is absent, and appearance is good.

○: Silver streak is almost absent, and appearance is good.

x: Silver streak is slightly observed, and appearance is poor.

xx: Many pieces of silver streak are observed, and appearance is poor.

xxx: Significantly many pieces of silver streak are observed, and appearance is poor.

INDUSTRIAL APPLICABILITY

A thermoplastic resin composition of the present invention has excellent thermal stability in residence, reflectance and appearance, because titanium oxide whose properties are regulated by removal of impurities. Therefore, the thermoplastic resin composition of the present invention can be preferably used in the sectors, for example, of office automation equipment, electrical and electronic equipment, etc.

The invention claimed is:

1. A thermoplastic resin composition comprising
(A) 40 to 98 mass % of a thermoplastic resin; and
(B) 60 to 2 mass % of coated titanium oxide particles, wherein
the thermoplastic resin is a polycarbonate-type resin or a blend of a polycarbonate-type resin and another thermoplastic resin;
the coated titanium oxide particles comprise titanium oxide whose surface is coated with a hydrous oxide and/or an oxide of at least one metal selected from the group consisting of aluminum, silicon, zirconium, tin, cerium, titanium and zinc;
the coated titanium oxide particles contain 80 to less than 97 mass % of titanium oxide; and
the coated titanium oxide particles contain alkali metal cations that can be extracted to water and alkaline-earth metal cations that can be extracted to water in a total amount of 120 mass ppm or lower.

2. The thermoplastic resin composition according to claim 1, wherein the metal hydrous oxide and/or the metal oxide as ingredient (B) is silica and/or alumina.

3. The thermoplastic resin composition according to claim 1, wherein, when the total amount of alkali metal cations and alkaline-earth metal cations that can be extracted to water is designated as X (mass ppm), the value of [the blending ratio of titanium oxide powder (mass %)/the blending ratio of thermoplastic resin (mass %)]×[X (mass ppm)] is 15 mass ppm or less.

4. A thermoplastic resin composition, wherein (C) 0.05 to 3 parts by weight of an organopolysiloxane is blended to 100 parts by weight of the thermoplastic resin composition according to claim 1.

5. The thermoplastic resin composition according to claim 1, wherein the total amount of alkali metal cations and alkaline-earth metal cations that can be extracted from the thermoplastic resin composition is 3 mass ppm or less based on titanium oxide.

6. A molded object manufactured by molding of the thermoplastic resin composition according to claim 1.

7. The molded object according to claim 6, wherein the molded object is either an extrusion molded object or an injection molded object.

8. The molded object according to claim 7, wherein the injection molded object is a reflecting plate.

9. The molded object according to claim 6, wherein the total amount of alkali metal cations and alkaline-earth metal cations that can be extracted from the molded object is 3 mass ppm or less based on titanium oxide.

10. Coated titanium oxide particles comprising titanium oxide whose surface is coated with a hydrous oxide and/or an oxide of at least one metal selected from the group consisting of aluminum, silicon, zirconium, tin, cerium, titanium and zinc, wherein
the coated titanium oxide particles contain 80 to less than 97 mass % of titanium oxide; and
the coated titanium oxide particles contain alkali metal cations that can be extracted to water and alkaline-earth metal cations that can be extracted to water in a total amount of 120 mass ppm or lower.

11. The coated titanium oxide particles according to claim 10, wherein the metal hydrous oxide and/or the metal oxide is silica and/or alumina.

12. The coated titanium oxide particles according to claim 10, whose surface is further coated with an organopolysiloxane.

13. The thermoplastic resin composition according to claim 1, wherein the thermoplastic resin comprises 50 mass % or more of the polycarbonate-type resin.

14. The thermoplastic resin composition according to claim 1, wherein the coated titanium oxide particles have a particle size in a range of from 0.1 to 0.5 μm.

15. The thermoplastic resin composition according to claim 10, wherein the coated titanium oxide particles have a particle size in a range of from 0.1 to 0.5 μm.

16. The thermoplastic resin composition according to claim 1, wherein the titanium oxide comprises rutile.

17. The thermoplastic resin composition according to claim 10, wherein the titanium oxide comprises rutile.

* * * * *